INVENTOR
Paul S. Dickey.
BY Charles E. Lullar
ATTORNEY

June 12, 1934.　　　　P. S. DICKEY　　　　1,962,677
POWER AMPLIFYING POSITIONING DEVICE
Filed July 16, 1931　　　3 Sheets-Sheet 2

INVENTOR
Paul S. Dickey.
BY
Charles E. Lullar
ATTORNEY

June 12, 1934.   P. S. DICKEY   1,962,677
POWER AMPLIFYING POSITIONING DEVICE
Filed July 16, 1931   3 Sheets-Sheet 3

INVENTOR
Paul S. Dickey.
BY
Charles E. Fuller.
ATTORNEY

Patented June 12, 1934

1,962,677

UNITED STATES PATENT OFFICE 1,962,677

POWER AMPLIFYING POSITIONING DEVICE

Paul S. Dickey, Cleveland, Ohio, assignor to Bailey Meter Company, a corporation of Delaware Application July 16, 1931, Serial No. 551,215

15 Claims. (Cl. 60—52)

This invention relates in general to apparatus wherein the positioning of a member by a relatively weaker control force, results in the positioning of another member located remotely from the first member by an amplified or relatively greater force, to accomplish a useful purpose. Such apparatus may be known as torque or power amplifiers, and may position the second member directly in step with the first member, or the movement of the second member may bear a functional relation to the movement of the first member or a relation to the amount and direction of departure of the first member from a given position; but in any event the second member is caused to move or to be positioned as the result of a change in position of the first member and with a force relatively greater than the force imparted to the first member.

The first member may be positioned or caused to depart from a given position through various causes; for example by variations in pressure, differential pressure, temperature, rate of fluidflow or in fact, any variable factor or relation whose controlling force is desirably magnified to position a second member requiring a relatively greater force for such positioning. The second member so positioned may move an indicator or can be used to move a damper or valve or desirable regulable mechanism whose movement may or may not result in a change in value of the factor which caused the initial movement of the first member.

My invention relates in particular to a combination of electrical and hydraulic control apparatus wherein I reproduce remotely, electrically, a position of the first or relatively weaker member, and at the remote point cause this reproduced position to control a hydraulic force or fluid pressure means for accomplishing a useful purpose with desired amplification of force over that which caused the positioning of the first member.

One object of my invention is to provide apparatus for remotely positioning a member in accordance with the position of a first member, utilizing hydraulic power.

Another object is to remotely control hydraulically operated means for positioning a second member through the use of electrical transmission.

A further object is to arrange remote electrically controlled hydraulic power parts in a single self-contained or unitary construction.

A further object is to provide improved arrangement and construction of parts of such a device embodying hand control means and safety or emergency features.

I have chosen to illustrate certain preferred embodiments of my invention in connection with the utilization of a self-synchronous motor transmission system wherein a position of a first member, itself positioned responsive to flow, temperature, pressure, or any variable factor or relation of factors, causes a positioning of a pilot valve at the remote control point for controlling the passage of hydraulic fluid to a hydraulic piston for operating the control means. I have illustrated and will describe the apparatus in connection with both a positioning and a floating type of control. By "floating control" I mean a control system wherein, for example, a member is positioned or caused to depart from a predetermined position through the variation of a factor or relation from a predetermined value, such departure resulting in a correction or compensation of the apparatus under control to return the factor or relation to its original value and correspondingly the member to its predetermined position. This distinguished from what is known as a "geared or positioning control", wherein the member has a definite position corresponding to each value of a factor and does not necessarily return to a predetermined position when the compensation has been applied to the apparatus.

It is my conception, however, that the movement or positioning of the second member may or may not result in a control or regulation of the factor whose variations produced a positioning of the first member.

I have illustrated and will describe such a floating control in connection with the regulation of the feed of water to a steam generating boiler from the variable factors, namely; steam flow, water flow and water level, varying with operation of the boiler, and wherein my improved hydraulically operated device at the receiving end embodies a unitary construction mounted on the valve as a part of the valve, for receiving remotely through self-synchronous motor transmission the position of a first member itself positioned by the inter-relation of the three variable factors and using such position to control, through hydraulic power amplifying means, the regulating valve.

As an example of a positioning type of control I show my invention in connection with the positioning of a damper in a fluid flow duct by a unitary construction of the apparatus remotely positioned from variations of pressure at a remote point in the duct.

Figure 1:
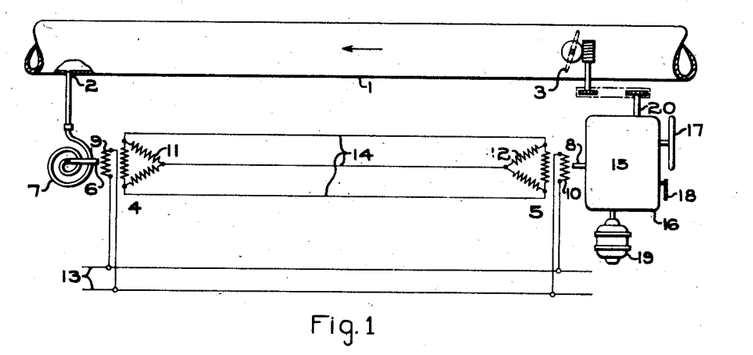
Fig. 1 is a somewhat diagrammatic representation of a complete system embodying the invention.

Considering first Fig. 1, I show an arrangement and apparatus of the sort which I designate as "a positioning control" and have shown it in connection with the control of pressure of a fluid flowing through a conduit such as the conduit 1 and in the direction of the arrow. I desirably control the pressure of the fluid indicated at a point 2 through the positioning across the conduit of the damper or valve means 3 at a remote or distant point. An electrical transmission system embodying self-synchronous motors for carrying an indication of the pressure at 2 to the control means remotely located at 3 is shown.

The self-synchronous or selsyn motors are indicated in general at 4 and 5. I designate at 4 a transmitting generator and at 5 a receiving motor. The transmitting generator is operated at a suitable angular rotation, of the order of 30° maximum, through angular positioning of the generator shaft 6. I have illustrated a Bourdon tube at 7 responsive to pressure variations of the fluid within the conduit 1 at the point 2 and adapted to angularly rotate the generator shaft 6, positioning same definitely with pressure. A rotor shaft 8 of the receiving motor positions angularly in synchronism with rotor shaft 6 of the transmitting generator.

The generator and motor are similar in construction, having single phase field windings 9 and 10 on the rotors, and three phase armature windings 11 and 12 on the stators. The field windings are energized from a suitable source of alternating current supply 13, while like points of the armature windings are interconnected by the conductors 14.

The operation of systems of this general character for the transmission of angular movement is well known in the art. Voltages are induced in the three phase stator windings of the generator and motor by the single phase field windings on the associated rotors. When the rotors of the generator and motor are in the same angular position with respect to their stators, the induced voltages in the armature windings are equal and opposite, and consequently no current is set up in the armature windings. If the rotor of the generator is turned and held in a new position, the voltage is no longer counterbalanced, whereby equalizing currents are caused to flow in the armature windings. The equalizing currents exert a torque on the rotor of the motor, causing it to take up a position corresponding to the position of the generator rotor. Angular movement imparted to the generator 4 is therefore reproduced by receiving motor 5. When the shaft 6 is rotated, a proportional rotation occurs in angular movement or rotation of the shaft 8, remotely located in the present embodiment at a point adjacent the control means 3 of the flow of fluid through the conduit 1.

Figure 2:
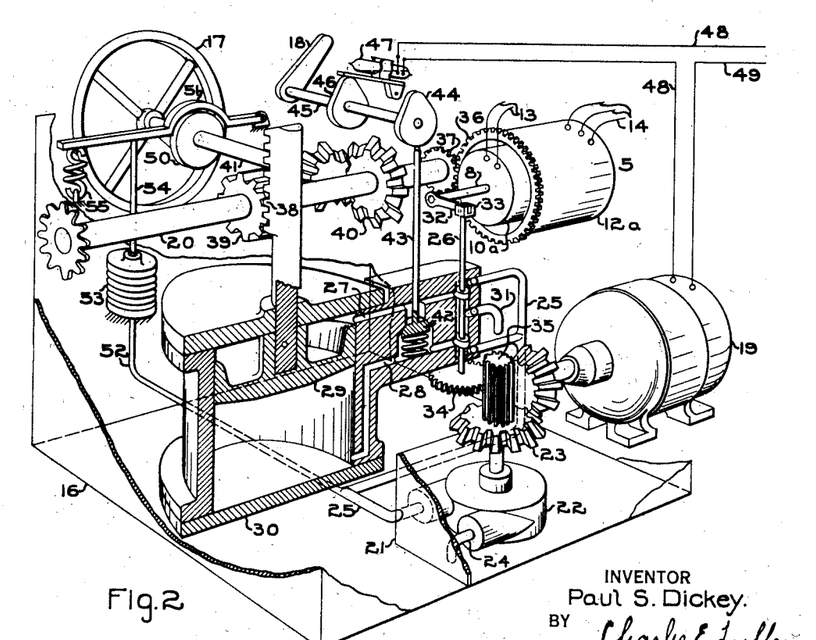
Fig. 2 is a somewhat diagrammatic view in perspective of a device embodying the invention, and such as comprises a part of Fig. 1.

The device 15 of Fig. 1 which is shown in perspective with parts broken away in Fig. 2, has in Fig. 1 the receiving motor 5 shown in electrical diagrammatic form external of the case 16, whereas actually the receiving motor would probably be located within the case 16 for protection and is so shown in Fig. 2. A handwheel 17 is provided, as well as a cam operating lever 18, a pump drive continuously running motor 19 and an output shaft 20. The output shaft is shown as connected through suitable gearing to position the damper 3 as a result of hand positioning of the handwheel 17, or automatically from a positioning of the rotor shaft 8 remotely as will be explained hereinafter.

In general, the device 15 comprises a source of hydraulic fluid pressure, a pilot valve for controlling same, a hydraulic piston and cylinder for providing torque and movement to the output shaft 20, a means for remotely causing a positioning of the pilot and in various features of construction and arrangement in connection therewith.

A partition 21 interior of the casing 16, forms with the bottom and sides of the casing, a reservoir for hydraulic fluid, in this case oil, and in which is positioned a rotary oil pump 22 driven continuously by the motor 19 through gearing 23. The oil pump 22 draws oil through the pipe 24 from the chamber in which the pump is positioned, and discharges oil under pressure through the pipe 25 to the casing of a pilot 26.

Through the casing of the pilot 26 are fluid channels 27 and 28 leading respectively to above and below a piston 29 adapted for axial movement in a cylinder 30. Oil under pressure from the pump 22 is available at the pilot 26, to the end that when the pilot is moved upward from alignment with the openings to the channels 27 and 28, the oil under pressure may pass through the channel 28 to the bottom of the piston 29 for moving the same upward, and conversely, when the pilot 26 is moved downward, oil under pressure may pass through the channel 27 to the upper side of the piston 29 for causing same to move downward. Simultaneously with the admission of oil under pressure to the cylinder at one end of the piston, oil is drained from the cylinder at the other end through one of the channels, and passes through the drainpipe 31 to flood over the gears and drop into the oil reservoir surrounding the pump 22.

An arm 32 fastened to the shaft 8 of the receiving motor 5 is provided at its revolving extremity with a special connection 33 to the pilot 26 which allows the pilot to move axially (vertically in the drawing) upon an angular rotation of the arm 32, and at the same time allows the pilot to be rotated for keeping the same free for axial positioning, the said rotation accomplished through the gear 34 carried at the lower extremity of the pilot 26 and meshing with an elongated pinion 35 driven continuously with the shaft of the pump 22 by the motor 19.

8 is the shaft of a rotor 10a, suitably journaled and carrying the field winding illustrated at 10 in Fig. 1. Cooperating with the rotor is a stator 12a carrying the three-phase armature winding indicated at 12 in Fig. 1, the stator in turn being journaled, so that the stator and rotor may both or either move, together or separately, in the same or opposite directions and relative to each other.

The piston 29 positions a rack 38 driving a gear 39 on the output shaft 20. Fastened to the output shaft 20 is a gear 37 which meshes with a gear 36 formed on the stator 12a to the end that when the output shaft 20 is positioned through a positioning of the hydraulic piston 29, simultaneously the stator 12a is positioned in desired direction and proportionally.

Also driven from the output shaft 20, through the gears 40, is a shaft 41 carrying external of the casing 16 a handwheel 17, which in turn may be used as the driving means of the shaft 41 and through the gears 40 of the shaft 20, the stator 12a and the piston 29. It is essential, however, that when handwheel operation is desirably accomplished by means of the handwheel 17, the oil pressure be released from the opposite sides of the piston 29, otherwise the said piston would act as a brake upon movement of the handwheel 17. To accomplish such a relief of pressure on opposite sides of the piston 29, I provide a valve 42 positioned relative to a seat in a communicating passage between the passages 27 and 28 and spring urged to seat in an upward direction as illustrated on the drawings. The valve 42 is carried by a rod 43, the upper end of which rests lightly against or with slight clearance relative to a cam 44 when the valve 42 is on its seat. In this position communication between the passages 27 and 28 is closed off by the valve, but the arrangement is such that upon rotation of the cam 44, the rod 43 is forced downward and the valve 42 away from its seat, so that communication is established between the channels 27 and 28 to the end that the pressure is equalized across the piston 29, and the piston may be moved toward one end or the other of the cylinder 30 within which it cooperates.

The cam 44 is carried by a shaft 45 extending externally of the casing 16 and terminating in a cam operating handle 18. Carried by the same shaft is a second cam 46, normally effective in holding close-circuited a mercury switch 47 to which is led a conductor 48 from the motor 19, which with the conductor 49 supplies electric power to the motor. The motor 19 is normally operative, while if the handle 18 is thrown to a position substantially 180° from that shown, and in which position the bypass valve 42 is open, at the same time the circuit of the conductor 48 is opened and the oil pump 22 is stopped in its rotation.

I have provided the shaft 41 with a brake drum 50 having a brake strap 51 cooperating therewith to prevent, at time of hand operation or cessation of fluid pressure across the piston 29, the drifting of the piston or output shaft 20 to other than the last-turned position. The brake strap 51 is pivoted at one end to a fixed support, and at the other is spring urged to contact with the drum 50. Under fluid pressure operation, however, the pressure of the oil within the pipe 25 is effective through a branch 52 upon an expansible metal bellows 53, one end of which is rigidly held, and the other end fixed to a rod 54 bearing at its opposite extremity against an extension of the friction strap 51. Thus when oil pressure exists above a predetermined value within the pipe 25 and the branch 52 upon the interior of the expansible metal bellows 53, the rod 54 forces upward the brake strap 51 against the pull of the spring 55. The brake strap 51 is thus released from contact with the drum 50 and offers no resistance to normal operation and rotation of the shaft 41.

Considering in general the operation of the apparatus illustrated in Figs. 1 and 2 and just described, I will describe as an example the operation when pressure at the point 2 of the conduit 1 departs from a predetermined desired value.

Assume for example that the pressure for some reason falls below the predetermined desired value. Such pressure effective upon the interior of the Bourdon tube 7 causes the tube to close up with its free end moving to rotate the shaft 6 through, for example, a few degrees of angular motion. Simultaneously, and correspondingly, as explained above, the rotor shaft 8 of the receiving motor 5 is rotated a desirable number of degrees in a counter-clockwise direction, looking toward the right in Fig. 2, resulting in an upward positioning of the pilot 26. Such positioning of the pilot 26 and assuming oil pressure available through the pipe 25, allows passage of such oil under pressure through the channel 28 to the cylinder 30 below the piston 29 for moving the piston upward. Simultaneously, the upward positioning of the pilot 26 has opened the passage 27 to allow a drainage of oil from above the piston 29 so that the piston and the rack 38 carried thereby can move upward, resulting in a counter-clockwise rotation of the output shaft 20 as viewed in the drawings looking toward the right, resulting in a positioning of the damper 3 further open to build up at the point 2 the pressure of the fluid toward the predetermined desired value.

So long as the pilot 26 has its lands out of alignment with the port openings to the passages 27 and 28, oil pressure will continue to be effective upon the bottom of the piston 29 and drainage effective from above the piston 29, and rotation of the output shaft 20 will continue. Only a certain amount of rotation of the output shaft 20, however, is desired, as may be determined by the amount of angular positioning of the rotor of the transmitting generator 4 relative to its stator.

The characteristics of the self-synchronous motor transmission system are such that so long as the electrical relation between the stator and rotor of the receiving motor agree with the electrical relation between the stator and rotor of the transmitting generator, the self-synchronous transmission system is in equilibrium. An arrangement of parts has been so provided that such electrical relation between the stator and rotor of the receiving motor may be maintained, while the pilot 26 is returned to its original shutoff position after the desired movement of the output shaft 20 has been accomplished. This by the movement of the stator 12a, through the gears 36, 37.

When the output shaft 20 is turned in a counter-clockwise direction following the counterclockwise rotation of the rotor 10a, the gear 37 rotating counterclockwise positions the gear 36 and the stator 12a in a clockwise direction relative to the rotor 10a and the electrical relation between the two maintains the same relative position between the stator 12a and the rotor 10a, dragging the said rotor in a clockwise rotation and repositioning the pilot 26 to shut-off position.

Should it be desired to operate the damper 3 by means of the handwheel 17 entirely independently of the pressure at 2 or of the self-synchronous motor transmission means, the lever 18 is thrown to approximately 180° from its shown position, causing simultaneously through rotation of the cam 44, the bypassing of pressure across the piston 29 as well as a breaking of the circuit of the motor 19 through the mercury switch 47 to the end that oil pressure effect is released from the piston 29. When oil pressure fails within the pipe branch 52 and the expansible metal bellows 53, the spring loaded brake 51 contacts with its corresponding drum 50, keeping the equipment from drifting. It is now possible through the handwheel 17 to turn at will by means of the gearing 40 the output shaft 20, carrying with it the piston 29 and the stator 12a regardless of the previous position of the stator 12a or its rotor 10a relative to each other or the two relative to the assembly of other parts.

Immediately it is desired to return to automatic control, the lever 18 is returned to its original position, causing a closing of circuit to the motor 19 through the mercury switch 47 and a closing off of communication between the oil passages 27 and 28. A starting of the motor 19 and correspondingly of the oil pump 22 causes a release of the brake band 51 from the brake drum 50, and application of fluid pressure through the pipe 25 to the casing of the pilot 26. The position of the stator 12a is in accordance with the position of the output shaft 20, and the position of the rotor 10a in accordance with the relation of stator to rotor of the transmitting generator 4. Equilibrium must exist between the angular relation between the stator 12a and the rotor 10a, with the pilot 26 in its shutoff position, and such equilibrium position will be accomplished automatically through an application of oil pressure to the top or bottom of the piston 29 in case the pilot 26 was not in its shutoff position. Thus upon returning to automatic operation, all parts will assume a position corresponding to a predetermined damper position, as dictated by the relation between the stator and rotor of the transmitting generator 4.

Figure 3:
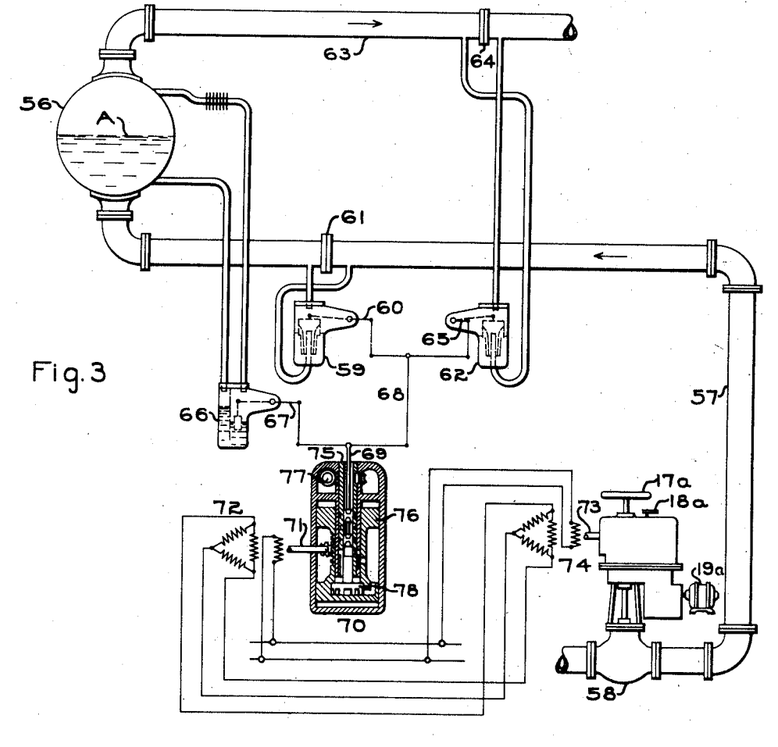
Fig. 3 is a somewhat diagrammatic representation of a complete system embodying the invention, but differing from the arrangement of Fig. 1.

In Fig. 3 I have illustrated somewhat diagrammatically an embodiment of my invention incorporated in a floating control and in connection with the feeding of water to a steam generating boiler. I use in general a balance of the water input against the steam output, in connection with a measure of the level of water within the boiler, to control the rate of water input to the boiler. Meters are employed for measuring the water input, the steam output and the water level, and mechanical linkage interconnects the meters to the end that a first member is positioned upon a departure from predetermined relation of the various meter readings, said member moving from a predetermined position to result in a corresponding movement of a regulating valve at a remote point to vary the rate of water input to the boiler. The position of the first member being transmitted or reproduced at the valve through self-synchronous motor means, and at the valve a unitary construction embodies an operating hydraulic means through a positioning of the receiving motor.

The balancing of feed water input to a boiler with the rate of flow of steam discharged from the boiler and the readjusting of the input to maintain a predetermined level of the water stored in the boiler is disclosed in the patent to Fenno No. 1,649,342 granted November 15, 1927, and my present embodiment is in part an improvement to the means and apparatus disclosed by the said patent. It must be understood, however, that the use of my invention is not limited to the feeding of water to a boiler, nor when used in connection with the feeding of water to a boiler is it limited to the arrangement shown and claimed in the said Fenno patent. I have illustrated and will describe the arrangement for such feeding of water to a boiler as one embodiment only of my invention.

In Fig. 3 I have illustrated at 56 the drum of a steam generating boiler wherein is desirably maintained a water level indicated at "A". Water is fed to the boiler through a conduit 57, in amount controlled by the throttling position of a regulating valve indicated generally at 58. The rate of flow of the water fed to the boiler is indicated by a flow meter 59 having an indicating arm 60 positioned angularly, responsive to a pressure differential resulting from a change in velocity of the water in flowing past an obstruction within the conduit 57. Such an obstruction for creating a pressure differential bearing a known relation to rate of flow may be an orifice, as is well known in the art, formed in a plate and held by the flanges 61. The flow meter 59 may be of the liquid sealed bell type as illustrated and described in the patent to Ledoux No. 1,064,748. Such a meter is a differential pressure responsive device and adapted to correct for non-linear relation between differential pressure and rate of flow, to the end that angular positioning of the indicating arm 60 is by increments directly proportional to increments of rate of flow. I have illustrated by dotted lines within the flow meter 59 and within a similar meter 62 (later to be described) the outline of the internal construction of this type of meter which is more fully illustrated and described in the above mentioned Ledoux patent.

Steam generated in the boiler leaves the drum 56 through a conduit 63. A rate of flow meter 62 responsive to a pressure differential created by an orifice or similar device held by the flanges 64 positions an indicating arm 65 by increments directly proportional to increments of rate of flow and in a manner as described relative to the flow meter 59.

Responsive to variations in the level "A" of the water within the boiler drum 56, I have shown a differential pressure responsive device 66 having a float riding on the surface of a liquid, such as mercury, in one leg of a U-tube in a well known manner, to position an indicating arm 67 directly in accordance with changes in the level "A". The two legs of the U-tube are connected to the boiler drum through suitable conduits. The leg in which the float rides is connected to the top of the drum whereas the opposite leg of the U-tube is connected to the bottom of the drum. The pressure responsive device 66 and connecting conduits are maintained full of water at all times, a constant head of water being maintained on the leg in which the float is located by means of a radiating surface suitably located in the horizontal section of the connecting conduit. It is, therefore, apparent that when the level in the drum 56 is at a point adjacent to the horizontal section of the conduit leading to the float chamber, the mercury level in the two legs of the U-tube will be the same inasmuch as the head on both legs is equal. However, as the level in the drum falls the mercury in the float chamber will likewise fall, whereas that in the other leg will rise as the hydrostatic head acting upon the float chamber remains constant, while that acting upon the opposite leg increases and decreases in accordance with the level within the drum. Through the linkage generally indicated at 68 I cause to be vertically positioned a pilot 69 of an operating device indicated in general at 70. The arrangement is such that the rate of water flow to the boiler is balanced against the rate of steam flow from the boiler, causing equal movements of the indicating arms 60 and 65 in opposite directions of rotation, with no resulting vertical motion of the pilot 69 if the water input equals the steam output, but if for any reason such as leakage of water from the boiler drum the level "A" does not remain constant or at a desirable predetermined line, then a movement of the indicating arm 67 will position the pilot 69 vertically.

Conversely, should the level "A" and the indicating arm 67 remain at their predetermined position, but the rate of flow of water to the boiler be not equal to the rate of flow of steam from the boiler, the resulting motion through the linkage 68 will be a vertical positioning of the pilot 69. Such a condition is possible due to change in density of the water below the surface "A" or for other reasons. In any event, the arrangement is such that the rate of steam flow is balanced against the rate of water flow and a predetermined water level desirably maintained, and when such relations are departed from, the pilot 69 is positioned vertically. The device indicated in general at 70 is in the nature of a torque or power amplifier, and is disclosed and claimed in the co-pending application of Clarence Johnson, Serial No. 515,325 filed February 12, 1931, which device will be described briefly hereinafter to make clear its operation and use in connection with my invention; but it is to be understood that the particular features of the device 70 are not claimed herein, but are disclosed and claimed in the above mentioned application of Johnson.

The purpose of the device 70 is to position in desirable direction and amount a member 71 in accordance with the positioning of the pilot 69 where the power required to position the member 71 may be relatively greater than that power which positions the pilot 69, and where the desired direction and amount of positioning of the member 71 is not necessarily equal to or in direct proportion to positioning of the pilot 69, but bears some mathematical relationship thereto.

For example, the arrangement illustrated is such that when the water input equals the steam output of the boiler and the level "A" is as desired, the pilot 69 will always be in a predetermined axial position regardless of the rate of operation of the boiler, and upon departure of desired conditions, the pilot departs in one direction or the other from the predetermined position, but always returns to the predetermined position when desired conditions are re-established. To obtain such conditions, however, means that the valve indicated in general at 58 and illustrated in detail in Fig. 4, must assume different positions of throttling within the conduit 57 to vary the rate of water input in accordance with the rate of steam output and to maintain the level "A" as desired regardless of leakage or other usage of water than that of steam output. Thus the positioning of the valve 58 is desirably in accordance with the direction and the amount of departure of the pilot 69 from its predetermined position, as well as the length of time during which it is away from said predetermined position. The device 70 serves to accomplish such a purpose through a positioning of the member 71 upon a departure of the pilot 69 from predetermined position.

In the present embodiment of the invention the member 71 is the shaft of the rotor of a transmitting generator 72 of a self-synchronous electrical transmission system through the medium of which the position of the member 71 is transmitted or reproduced (at a remote point if desired), to result in the control of an amplified hydraulic means for positioning of the valve 58.

I have previously described in connection with Fig. 1 such a self-synchronous electrical transmission of position between members, and in connection with Fig. 3 it is necessary only to say that the position of the member 71 of the transmitting generator 72 is reproduced at the member 73 of the receiving motor 74, the said receiving motor being located in connection with the valve 58. When the member 71 is angularly positioned in response to deviation of the pilot 69 from a predetermined position, the angular movement is reproduced in angular motion in desired proportion on the rotor shaft 73, to result in a control of position of throttling of the valve 58.

Mounted on and operating the valve 58 is a mechanism of similar construction and purpose to that illustrated in Fig. 2, and having an external handwheel 17a, a bypass lever 18a and a pump drive motor 19a, similar to those of Figs. 1 and 2. The assembly and arrangement as well as operation of the valve 58 and its mounting are shown in Fig. 4 in detail.

The device 70 comprises a hydraulic torque amplifier wherein the axial positioning of the pilot 69 relative to ports in a sleeve 75 controls the passage of hydraulic fluid to one end or the other of a piston 76 for positioning the same vertically to cause rotation of the output shaft 71, in this case the shaft of the rotor of the transmitting generator 72. The sleeve 75 is desirably rotated continuously relative to the pilot 69 through any suitable means such as a worm 77, and rotated by the sleeve 75 is a hydraulic pump 78 carried axially within the piston 76 and serving to provide hydraulic fluid under pressure, available at the pilot 69, for application to one end or the other of the piston for movement of same.

Figures 4, 5:
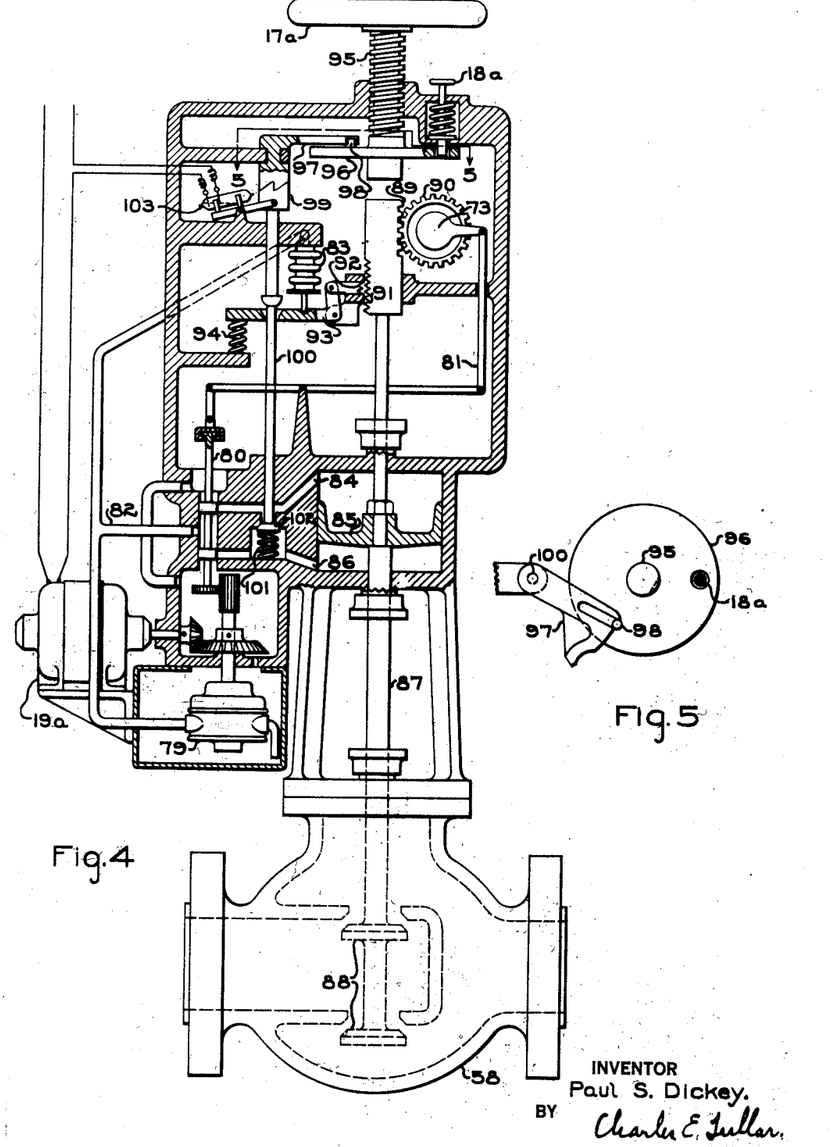
Fig. 4 is an elevation, partly in section, of a device comprising a part of the layout in Fig. 3.
Fig. 5 is a section taken along the line 5—5 in the direction of the arrows of Fig. 4.

In Fig. 4 is shown in sectional elevation, the unitary construction of mounting on top of the valve 58 and in Fig. 5 a detail of certain parts of the mounting. The pump motor 19a serves to continually rotate the pump 79 and through the necessary gearing the pilot 80. The pilot is positioned axially upon angular movement of the rotor shaft 73 of the receiving motor through the medium of the pivoted linkage 81.

Fluid (such as oil) is drawn by the pump 79 from a sump surrounding the pump to which the oil drains from the pilot. From the pump 79 oil under pressure passes through a pipe 82 and through a branch to an expansible metal bellows 83. Oil available at the pilot 80 may, when the pilot is moved upward, pass through a channel 84 to above the power piston 85, and when the pilot 80 is moved downward, through a channel 86 to the space below the power piston 85.

The piston 85 is fastened to a vertically movable shaft 87 passing through the necessary pressure stuffing boxes and carrying at its lower end valve discs 88 for throttling the passage of water through the valve 58 on its way to the boiler. At the upper end the shaft 87 carries a rack 89 meshing with and driving the gear 90 formed on the stator of the receiving motor to cause a repositioning of the pilot 80, as explained in connection with the embodiment illustrated in Fig. 1.

On the upper end of the shaft 87 is further formed a clutch section 91, with which may cooperate a mating clutch section 92 when it is desired to lock the shaft 87 and the valve discs 88 in position at any time.

For normally holding out of engagement the clutch teeth 92 from the clutch teeth 91, is provided a bell crank lever 93 pivoted at its elbow, having one arm pivotally connected to reciprocate the clutch member 92 while the other arm is normally held in a downward direction against the spring 94 by the expansible metal bellows 83 when pressure of oil is available above a predetermined value within the bellows 83. It will be seen that when said oil pressure falls below a predetermined value, the bellows 83 is overcome by the spring 94, pivoting the bell crank 93 and reciprocating the clutch member 92 toward the right on the drawings so that its teeth engage and lock with the teeth 91 of the shaft 87. Thus at any time the oil pressure falls below a predetermined point, the shaft 87 and the valve discs carried thereby are locked against drift or movement unless it is desired by hand through the medium of the handwheel 17a to position the valve stem 87.

Should it be desired to position by hand the valve stem 87 through the medium of the handwheel 17a, this is accomplished through a rotation of said handwheel which in the present instance is shown as a clockwise rotation looking down upon the handwheel, causing the screw-threaded shaft 95, to which the handwheel is fastened, to move downward until the lowermost end of the shaft 95 engages the uppermost end of the valve stem 87 and further rotation in the same direction of the handwheel 17a results in a downward positioning of the valve stem 87. Before it is possible or desirable to rotate the handwheel 17a for such positioning of the valve stem, it is necessary to unlock the handwheel and its shaft for rotation, and this is accomplished through raising against spring compression, the bypass operating lever 18a whose projecting stem is normally positioned in a disc 96 carried at the lower end of the shaft 95. As the disc 96 is allowed to rotate, through upward raising of the handle 18a, the first revolution or part of a revolution of the disc causes it to move downward an amount sufficient that the projection of the stem of the handle 18a does not then come in contact with the upper surface of the disc 96 and the handle 18a need no longer be held up against the spring compression.

At the same time the first part of a revolution of the disc 96 causes a partial rotation of the arm 97 through engagement of a pin 98 therewith, said pin being carried by the upper surface of the disc 96. Partial rotation of the arm 97, the shaft of which carries inclined teeth designated at 99, causes said teeth to ride up on mating teeth of a vertically positioned rod 100, thereby moving the rod 100 downward against a compression spring 101, whereby a valve 102 is moved away from its seat and allows communication of oil between the passages 84 and 86 for equalizing the pressure across the piston 85.

At the same time the downward movement of the rod 100 causes a shoulder thereon to engage the upper surface of the bell crank arm 93, forcing it against the compression spring 94 and moving the clutch teeth 92 out of engagement with the mating teeth 91 so that when the handwheel is further rotated and the lowermost end of its shaft 95 encounters the uppermost end of the valve stem 87, there will be no mechanical resistance to downward movement of the valve stem through the clutch 91, 92 or fluid resistance from oil under pressure on the opposite sides of the piston 85 within the piston cylinder. Further, the downward positioning of the rod 100 results in an open circuiting of the mercury switch 103, breaking the electrical circuit to the motor 19a and stopping the fluid pump 79.

It will be seen that through my invention I utilize a self-synchronous electric motor transmission system for reproducing at a point of control, the position of a member moved by a relatively weak force in accordance with the value of a variable factor or relation of factors, which upon movement, calls for a change in the position of the control. I utilize as an amplified power, hydraulic means and arrange the parts to return the hydraulic pilot to its neutral position while maintaining the desired relation between sending and receiving self-synchronous motors through a return or follow-up of the stator of the receiving motor. I further provide the possibility of locking the device against travel when travel is not desired, and have the possibility of operation by handwheel at any time at the device. I have provided a unitary construction at the receiving power end, which assembly may be mounted directly at a damper, valve, rheostat or other controllable element, and at a quite remote distance from the sending or transmitting generator if desired.

The utility of regulating apparatus embodying the invention is by no means limited to the specific use of said mechanism which has been described, since so far as the operation of the regulating apparatus is concerned, the manner in which the sending selsyn is moved and the function of the controlled member are immaterial. It is apparent from the description which has been given that the regulating apparatus may be incorporated in governing mechanism for maintaining uniform conditions of all sorts, such as uniform conditions of the flow of an electric current or of the voltage of an electric current, or uniform position of apparatus of any sort. Furthermore, the regulating apparatus need not be a part of the governing mechanism, but may be used to control the position of any member in accordance with the movements of a needle or indicator whose position is not affected by that of the controlled member.

Certain broad features contemplating in general the utilization in series of floating and positioning type of control disclosed but not claimed herein, are disclosed and claimed in the copending application of Joseph C. Albright, Serial No. 599,565 filed March 17, 1932, and having the same assignee as the present invention.

What I claim as new and desire to secure by Letters Patent of the United States, is:

1. A system for reproducing position comprising in combination, an electrical sending element, a corresponding receiving element which is electrically connected with said sending element, a hydraulic motor mechanically controlled by said receiving element, a source of fluid supply for said motor, and means directly responsive to the pressure of said fluid supply and effective upon a decrease in pressure of the fluid below a predetermined value for locking said motor against movement.

2. A system for reproducing position comprising in combination, an electrical sending element, a corresponding receiving element which is electrically connected with said sending element, a hydraulic motor mechanically controlled by said receiving element, a source of fluid supply for said motor, hand operable means for positioning the motor, and means made effective upon operation of said hand operable means for relieving said hydraulic motor from fluid pressure control.

3. A system for reproducing position comprising in combination, an electrical sending element, a corresponding receiving element which is electrically connected with said sending element, a hydraulic motor mechanically controlled by said receiving element, a source of fluid supply for said motor, locking means responsive to a decrease in pressure of the fluid below a predetermined value for locking said motor against movement, hand operable means for positioning the motor, and means made effective upon operation of said hand operable means for reducing the pressure of said fluid below said predetermined value and for making ineffective said locking means.

4. A system for remote control of a regulating element comprising in combination, a control element remote from the regulating element, a transmitting generator actuated thereby, hydraulic operating means for said regulating element, a source of fluid supply under pressure for said hydraulic operating means, control means for said hydraulic operating means, a receiving motor for actuating the same, alternating current field and armature windings for said motor and generator, electrical connections for equalizing currents between said armature windings whereby the motor is caused to be in synchronism with the generator, and means directly responsive to the pressure of said fluid supply for said hydraulic operating means for automatically locking said regulating element against change of position, said means effective upon decrease of fluid supply pressure below a predetermined value.

5. A system for reproducing position comprising in combination, a transmitting generator, a corresponding receiving motor, alternating current field and armature windings for said motor and generator, electrical connections for equalizing currents between said armature windings whereby the motor is caused to be in synchronism with the generator, a hydraulic motor mechanically controlled by said receiving motor, hand operable means for positioning said hydraulic motor, and means made effective upon operation of said hand operable means for relieving said hydraulic motor from fluid pressure control.

6. A system for reproducing position comprising in combination, a transmitting generator, a corresponding receiving motor, alternating current field and armature windings for said motor and generator, electrical connections for equalizing currents between said armature windings whereby the motor is caused to be in synchronism with the generator, a hydraulic motor mechanically controlled by said receiving motor, a source of fluid supply under pressure for said hydraulic motor, locking means responsive to a decrease in pressure of fluid below a predetermined value for locking said hydraulic motor against movement, hand operable means for positioning the hydraulic motor, and means made effective upon operation of said hand operable means for reducing the pressure of said fluid supply below said predetermined value and for making ineffective said locking means.

7. A system for reproducing position comprising in combination, a transmitting generator, a corresponding receiving motor, alternating current field windings for said motor and generator, a source of alternating current supply for said field windings, polyphase armature windings for said motor and generator, electrical connections for equalizing currents between said armature windings whereby the motor is caused to be in synchronism with the generator, a hydraulic means mechanically controlled by said receiving motor, hand operable means for positioning said hydraulic means, and means made effective upon operation of said hand operable means for relieving said hydraulic means from fluid pressure control.

8. A system for reproducing position comprising in combination, a transmitting generator, a corresponding receiving motor, alternating current field windings for said motor and generator, a source of alternating current supply for said field windings, polyphase armature windings for said motor and generator, electrical connections for equalizing currents between said armature windings whereby the motor is caused to be in synchronism with the generator, a hydraulic motor mechanically controlled by said receiving motor, a source of fluid supply under pressure for said hydraulic motor, locking means responsive to a decrease in pressure of fluid below a predetermined value for locking said hydraulic motor against movement, hand operable means for positioning the hydraulic motor, and means made effective upon operation of said hand operable means for reducing the pressure of said fluid supply below said predetermined value and for making ineffective said locking means.

9. A system for remote control of a regulating element comprising in combination, a control element remote from the regulating element, a transmitting generator actuated thereby, hydraulic operating means for said regulating element, a source of fluid supply under pressure for said hydraulic operating means, a pilot valve for controlling the fluid, a receiving motor for positioning the pilot valve, alternating current field and armature windings for said motor and generator, electrical connections for equalizing currents between said armature windings whereby the motor is caused to be in synchronism with the generator, the armature winding of the generator stationary, the field winding of the generator adapted to be positioned relative to the corresponding armature winding by said control element, the field winding and armature winding of the receiving motor adapted to be positioned each relative to the other, the receiving motor field winding in synchronism with the transmitting generator field winding and the receiving motor armature winding by said hydraulic operating means whereby the same comprises a follow-up means for returning the pilot valve to shutoff position while maintaining in synchronism the relation of field and armature windings of said receiving motor relative to the relation of field and armature windings of the transmitting generator, and means for automatically locking the regulating element against change of position, said means effective upon departure of fluid supply pressure beyond a predetermined value.

10. A system for remote control of a regulating element comprising in combination, a control element remote from the regulating element, a transmitting generator actuated thereby, hydraulic operating means for said regulating element, a source of fluid supply under pressure for said hydraulic operating means, a pilot valve for controlling the fluid, a receiving motor for positioning the pilot valve, alternating current field and armature windings for said motor and generator, electrical connections for equalizing current between said armature winding whereby the motor is caused to be in synchronism with the generator, the armature winding of the generator stationary, the field winding of the generator adapted to be positioned relative to the corresponding armature winding by said control element, the field winding and armature winding of the receiving motor adapted to be positioned each relative to the other, the receiving motor field winding in synchronism with the transmitting generator field winding and the receiving motor armature winding by said hydraulic operating means whereby the same comprises a follow-up means for returning the pilot valve to shutoff position while maintaining in synchronism the relation of field and armature windings of said receiving motor relative to the relation of field and armature windings of the transmitting generator, hand operable means for positioning said regulating element, and means made effective upon operation of said hand operable means for making ineffective said hydraulic operating means upon the regulating element.

11. A controlling apparatus for a variable factor, comprising in combination, a control means for varying the value of the factor, hydraulic means for positioning the control means and comprising, a piston cooperating in a cylinder, a pump for supplying fluid under pressure to the cylinder, passages leading to the cylinder at opposite ends of the piston, a pilot valve adapted to control the flow of fluid through said passages; pressure equalizing means of the pressure on opposite ends of the piston, hand operable means for positioning the piston, locking means for locking said piston against movement, and fluid pressure means for actuating said locking means, said fluid pressure means effective upon departure of fluid supply pressure beyond a predetermined value.

12. A regulating device comprising in combination, a hydraulic motor, a source of fluid supply under pressure for the motor, a valve for controlling the fluid, said motor electro-magnetically coupled to said valve and comprising a follow-up, locking means responsive to a decrease in pressure of the fluid supply below a predetermined value for locking said motor against movement, hand operable means for positioning the motor, and means made effective upon operation of said hand operable means for reducing the pressure of said fluid supply below said predetermined value and for making ineffective said locking means.

13. A regulating device comprising in combination, a hydraulic motor, a source of fluid supply under pressure for the motor, a valve for controlling the fluid, a first element positioned by said motor, a second element positioned with said valve, the two elements electro-magnetically coupled, locking means responsive to a decrease in pressure of the fluid supply below a predetermined value for locking said motor against movement, hand operable means for positioning the motor, and means made effective upon operation of said hand operable means for reducing the pressure of said fluid supply below said predetermined value and for making ineffective said locking means.

14. In combination with a valve structure having a valve stem which when positioned causes a control of the flow of a fluid through the valve, an operator for such positioning comprising, a hydraulically operated piston adapted to position the valve stem and co-operating in a cylinder, a source of fluid supply under pressure, a pilot valve for controlling the fluid, an electro-magnetic coupling means comprising a field winding and an armature winding arranged to be positioned each relative to the other, the field winding positioned relative to the armature winding remotely electrically, the field winding adapted to position said pilot valve for admitting fluid under pressure to said cylinder for moving the piston, the armature winding positioned with the valve stem to provide an electro-magnetic follow-up whereby the pilot valve is returned to shut-off position, a normally stationary hand positioner of the valve stem, a locking lever for the hand positioner, means engaged upon movement of said hand positioner for causing an equalization of fluid pressure across said piston, means responsive to drop in fluid pressure below a predetermined value for locking said valve stem against movement, and means actuated by said hand positioner for making ineffective said last-named means.

15. A system for reproducing position comprising in combination, an electrical sending element, a corresponding receiving element which is electrically connected with said sending element, a hydraulic motor mechanically controlled by said receiving element, a source of fluid supply for said motor, locking means responsive to a decrease in pressure of the fluid below a predetermined value for locking said motor against movement, hand operable means for positioning the motor, and means made effective upon operation of said hand operable means for making ineffective said locking means.

PAUL S. DICKEY.